United States Patent
Kennis et al.

(10) Patent No.: US 8,339,634 B2
(45) Date of Patent: Dec. 25, 2012

(54) METHOD FOR SETTING CONFIGURATION DATA

(75) Inventors: Albert Kennis, Shizuoka (JP); Kenichi Gomi, Shizuoka (JP)

(73) Assignee: Star Micronics Co., Ltd., Shizuoka-Shi (JP)

( * ) Notice: Subject to any disclaimer, the term of this patent is extended or adjusted under 35 U.S.C. 154(b) by 1312 days.

(21) Appl. No.: 11/616,339

(22) Filed: Dec. 27, 2006

(65) Prior Publication Data

US 2007/0146733 A1 Jun. 28, 2007

(30) Foreign Application Priority Data

Dec. 28, 2005 (JP) .................................. 2005-377678

(51) Int. Cl.
  G06F 3/12 (2006.01)
  G06F 15/18 (2006.01)
  G06E 1/00 (2006.01)
  G06E 3/00 (2006.01)
  G06G 7/00 (2006.01)
(52) U.S. Cl. .......................................... 358/1.15; 706/16
(58) Field of Classification Search .................. 358/1.15; 706/16
  See application file for complete search history.

(56) References Cited

U.S. PATENT DOCUMENTS

| | | | |
|---|---|---|---|
| 6,930,788 B1 * | 8/2005 | Iwamoto et al. | 358/1.15 |
| 7,047,088 B2 * | 5/2006 | Nakamura et al. | 700/19 |
| 7,146,413 B2 * | 12/2006 | Spitzer et al. | 709/220 |
| 7,365,872 B2 * | 4/2008 | Lawrence et al. | 358/1.15 |
| 7,421,214 B2 * | 9/2008 | Ikeno et al. | 399/8 |
| 7,460,252 B2 * | 12/2008 | Campbell et al. | 358/1.1 |
| 7,583,396 B2 * | 9/2009 | Okazawa | 358/1.15 |
| 7,636,584 B2 * | 12/2009 | Anderson et al. | 455/556.2 |
| 2004/0030600 A1 * | 2/2004 | Lacroix | 705/16 |
| 2004/0085579 A1 * | 5/2004 | Campbell et al. | 358/1.18 |
| 2004/0184043 A1 * | 9/2004 | Hirosugi et al. | 358/1.1 |
| 2004/0196486 A1 * | 10/2004 | Uchino | 358/1.14 |
| 2005/0286079 A1 * | 12/2005 | Takagi | 358/1.15 |

(Continued)

FOREIGN PATENT DOCUMENTS

EP    1-435-565 A2    7/2004

(Continued)

OTHER PUBLICATIONS

Japanese Office action dated Aug. 3, 2010 for Appl. No. 2005-377678.

(Continued)

Primary Examiner — King Poon
Assistant Examiner — Jonathan Beckley
(74) Attorney, Agent, or Firm — Pearne & Gordon LLP

(57) ABSTRACT

A method is for setting configuration data to a print data supplying device. The print data supplying device is operable to: store data associated with at least one of a plurality of items of group information in a first storage area; generate print data based on: (1) internal print data generated by an internal print data generation program; and (2) configuration data associated with one of the items of group information corresponding to a printer to which the print data is supplied; and supply the print data to the printer. The method includes: determining whether or not a target printer is connected; generating a new item of group information corresponding to the target printer when the target printer is connected; and storing reference configuration data that is stored in a second storage area to the first storage area, as the configuration data, in association with the new item of the group information.

3 Claims, 8 Drawing Sheets

U.S. PATENT DOCUMENTS

2006/0010137 A1 * 1/2006 Johnson ........................ 707/100

FOREIGN PATENT DOCUMENTS

| JP | 2001-188697 A | 7/2001 |
| --- | --- | --- |
| JP | 2001-337801 A | 12/2001 |
| JP | 2004-246880 A | 9/2004 |
| JP | 2004-318495 A | 11/2004 |
| JP | 2005-267088 A | 9/2005 |

OTHER PUBLICATIONS

European Search Report.

* cited by examiner

FIG. 2

|  | QUANTITY | UNIT PRICE |
|---|---|---|
| SHOP A | | |
| BANANA | 2 | ¥100 |
| DOG FOOD | 1 | ¥75 |
| APPLE | 4 | ¥50 |
| KIWI FRUIT | 1 | ¥125 |
| TOOTHPASTE | 1 | ¥260 |
| COFFEE | 1 | ¥200 |
| TOTAL AMOUNT | | ¥1,060 |

THANK YOU

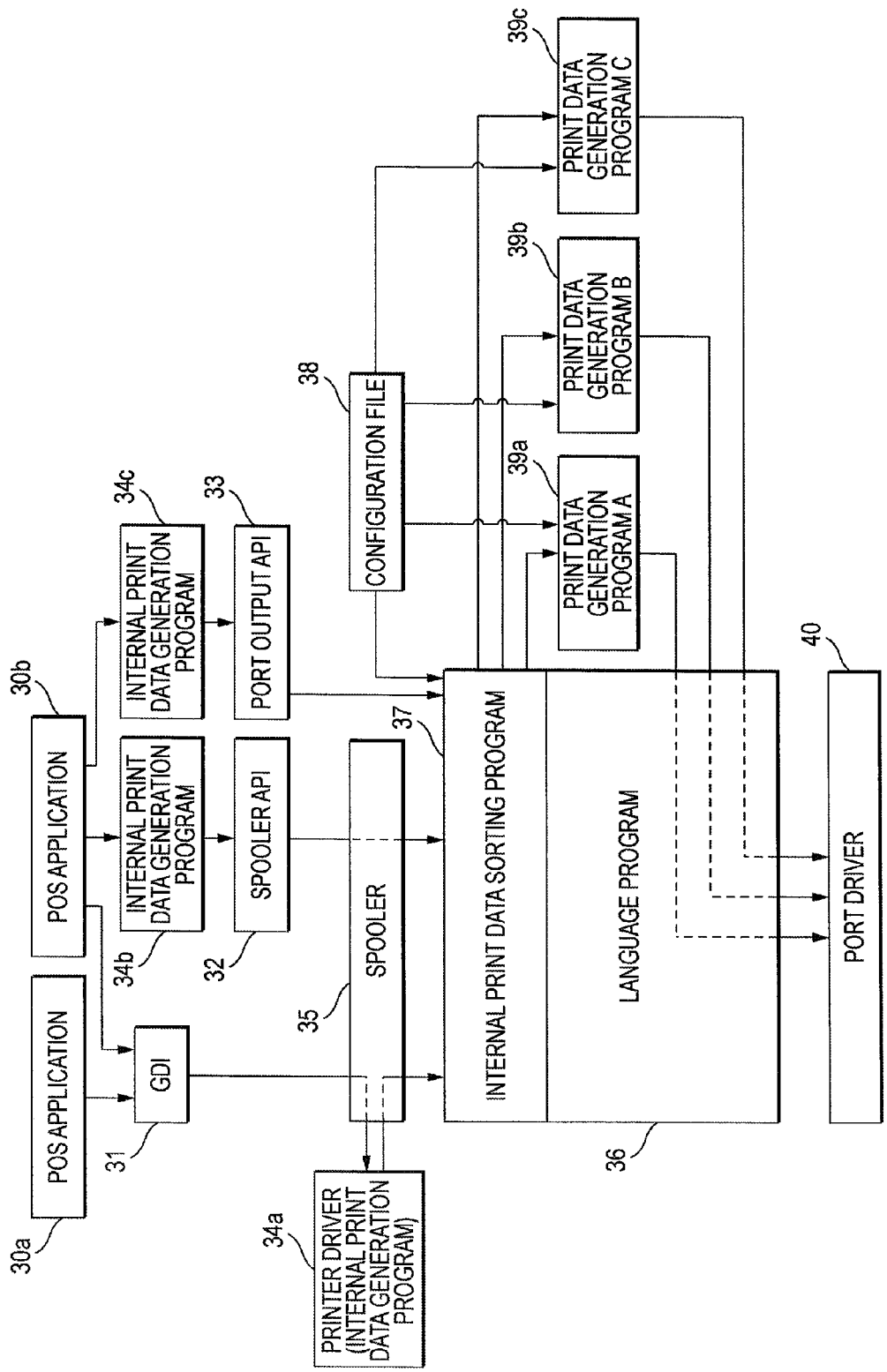

FIG. 4

| OUTPUT FLOW TYPE OF INTERNAL PRINT DATA | NAME OF INTERNAL PRINT DATA | PRINT DATA GENERATION PROGRAM |
|---|---|---|
| 1 | A | PRINT DATA GENERATION PROGRAM A (CONVERT INTERNAL PRINT DATA OF COMMAND SYSTEM "2" INTO PRINT DATA OF COMMAND SYSTEM "1") |
| 1 | B | PRINT DATA GENERATION PROGRAM B (SUBJECT RECEIPT IMAGE TO PREDETERMINED PROCESSING, AND CONVERT INTERNAL PRINT DATA OF COMMAND SYSTEM "2" INTO PRINT DATA OF COMMAND SYSTEM "1") |
| 2 | B | PRINT GENERATION PROGRAM A |
| 3 | B | PRINT GENERATION PROGRAM C (CONVERT INTERNAL PRINT DATA OF COMMAND SYSTEM "3" INTO PRINT DATA OF COMMAND SYSTEM "1") |

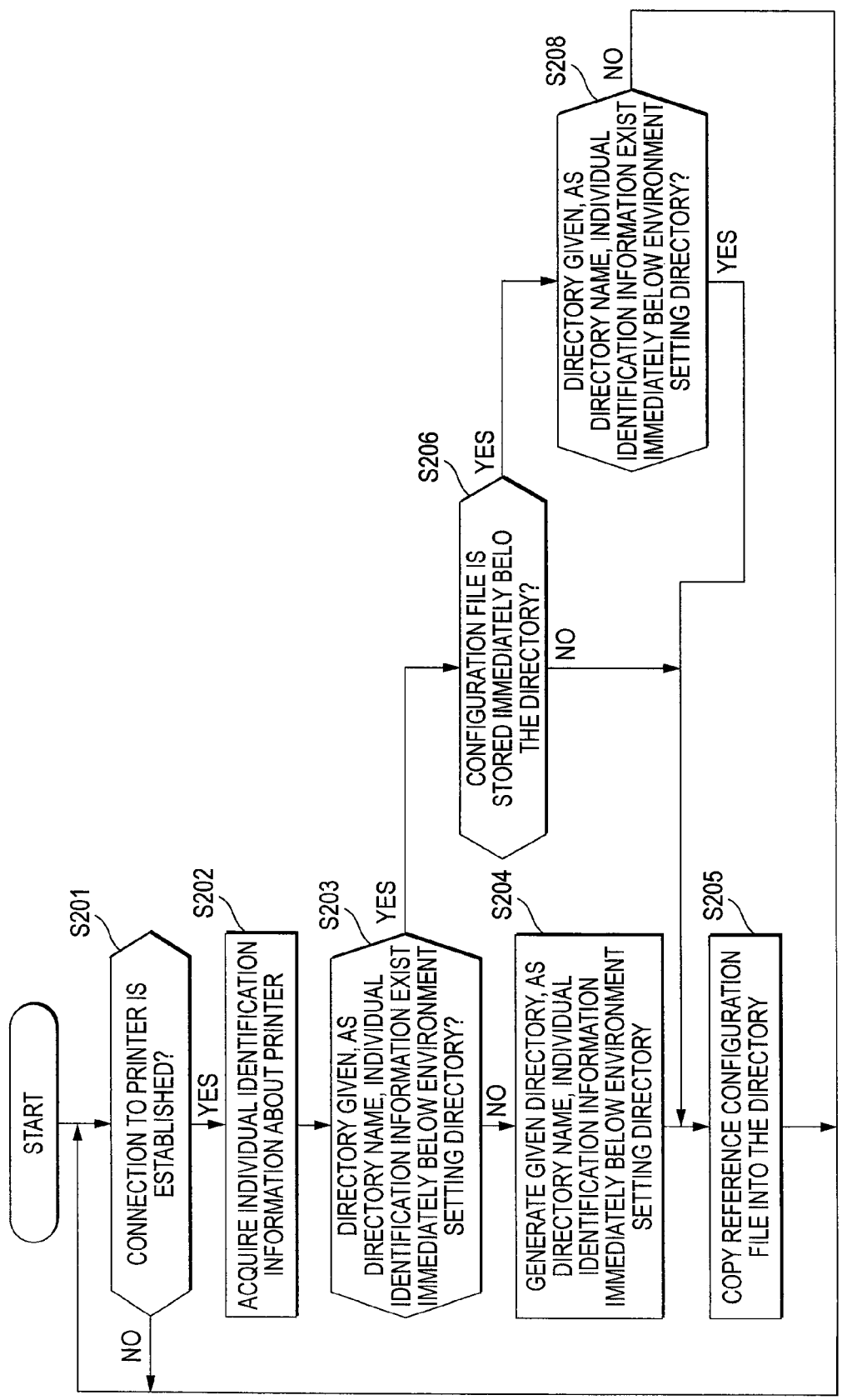

METHOD FOR SETTING CONFIGURATION DATA

CROSS REFERENCE TO RELATED APPLICATION

This application claims priority from a Japanese Patent Application No. 2005-377678 filed on Dec. 28, 2005, the entire subject matter of which is incorporated herein by reference.

TECHNICAL FIELD

The present invention relates to a method for setting configuration data, a computer-readable program product for setting configuration data, and a print data supplying device.

BACKGROUND

A commonly-known print system includes a printer and a print data supplying device that supplies print data to the printer and causes the printer to produce a printout of an image generated by an application program. For example, in a known print system, a print data supplying device supplies a printer with print data pertaining to a sales slip (hereinafter called a "receipt") image generated by a POS (Point Of Sales) application program, thereby causing the printer to produce a printout of the receipt image.

In the print system, when a printer is replaced with another printer, there sometimes arises a case where a difference is apparent between a printout produced by a pre-replacement printer (a printer employed before replacement) and a printout produced by a post-replacement printer (a printer employed after replacement) because of a difference in specifications of the pre-replacement printer and those of the post-replacement printer. In such case, in order to acquire a printout analogous to the printout of the pre-replacement printer, specifications and settings of the application program must be altered in consideration of specifications of the post-replacement printer.

In this regard, in such case, the print data supplying device is left with a configuration for outputting print data for the pre-replacement printer. Raster image data pertaining to an image to be printed are temporarily generated from the print data (internal print data) output from the configuration. Subsequently, it is conceived to generate print data used for causing the post-replacement printer to produce a printout of the raster image data and to supply the thus-generated print data to the printer. According to such configuration, a printout similar to that generated by the pre-replacement printer can be acquired by the post-replacement printer without modification of the specifications and settings of the application program.

In the above print system, when an image to be printed has been subjected to processing desired by the user during the course of printout and a printout of the image is generated, enhanced convenience can be achieved. For example, in a print system which produces a printout of a receipt image, provided that a keyword (e.g., the name of a specific commodity, or the like) specified by the user is included in a receipt image, when the image (e.g., a coupon image, an advertisement image, and the like) specified by the user is pasted to the receipt image, advertisement of a specific commodity to customers who purchased the specific commodity, advertisement of commodities relevant to the specific commodity or distribution of a coupon can be performed without fail while attempts are being made to lessen efforts, thereby enabling an improvement in the convenience of the print system.

In this respect, the print data supplying device is considered to temporarily generate raster image data pertaining to a print subject image from the print data (internal print data) output from a printer driver; to subject the raster image data to processing desired by the user; to subsequently generate print data used for causing a post-replacement printer to produce a printout of the processed raster image data; and to supply the thus-generated print data to the printer. As a result, a print subject image is subjected to processing desired by the user during the course of generation of a print output and a print output is generated, without involvement of modifications to specifications and settings of an application program. In addition, the convenience of the print system is enhanced.

According to the internal print data, the print system switches specifics (processing for generating print data from the internal print data) of print data generation processing performed by the print data supplying device, so that further enhanced convenience can be achieved.

When the above-described print system is achieved, for example, settings pertaining to processing to which a print subject image is subjected or settings pertaining to switching of print data generation processing have been stored in advance as configuration data. Print subject image processing and print data generation processing are generally switched on the basis of the configuration data. In the above print system, there is a case where a directory associated with an individual printer is used as a directory where such configuration data are to be stored. For example, in a case where a printer is connected to a computer via a USB (Universal Serial Bus) interface, when a serial number (identification number used for identifying an individual printer) is stored in a readable manner in the printer via the USB interface, a directory generated on the basis of the serial number is used. In contrast, when the serial number is not stored in the printer in a readable manner via the USB interface, there is sometimes used a directory generated from identification information about the USB port (a connection port complying with the USB interface standards) to which the printer is connected. In such case, the directory where the configuration file is to be stored varies from one print data supplying device to another on the basis of the serial number of the printer or identification information about the USB port to which the printer is connected. Therefore, operation for setting an configuration file becomes laborious for a person (e.g., a person in charge of setting up a print system, an administrator of the print system, or the like) who performs setting of the configuration file of the print system (the print data supplying device).

SUMMARY

According to an aspect of the present invention, there is provided a method for setting configuration data to a print data supplying device, wherein the print data supplying device is operable to: store data associated with at least one of a plurality of items of group information in a first storage area; generate print data based on: (1) internal print data generated by an internal print data generation program; and (2) configuration data associated with one of the items of group information corresponding to a printer to which the print data is supplied; and supply the print data to the printer, and wherein the method includes: determining whether or not a target printer is connected; generating a new item of group information corresponding to the target printer when the target printer is connected; and storing reference configuration data that is stored in a second storage area to the first storage area, as the configuration data, in association with the new item of the group information.

BRIEF DESCRIPTION OF THE DRAWINGS

In the accompanying drawings:

FIG. 2 is a view showing an example receipt image;

FIG. 3 is a view for describing print processing performed by a print data supplying device;

FIG. 4 is a view showing example information retained in an configuration file;

FIG. 7 is a flowchart showing processing performed by an configuration file setting program.

DETAILED DESCRIPTION

An embodiment of the present invention will be described in detail hereinbelow by reference to the drawings.

Figure 1:
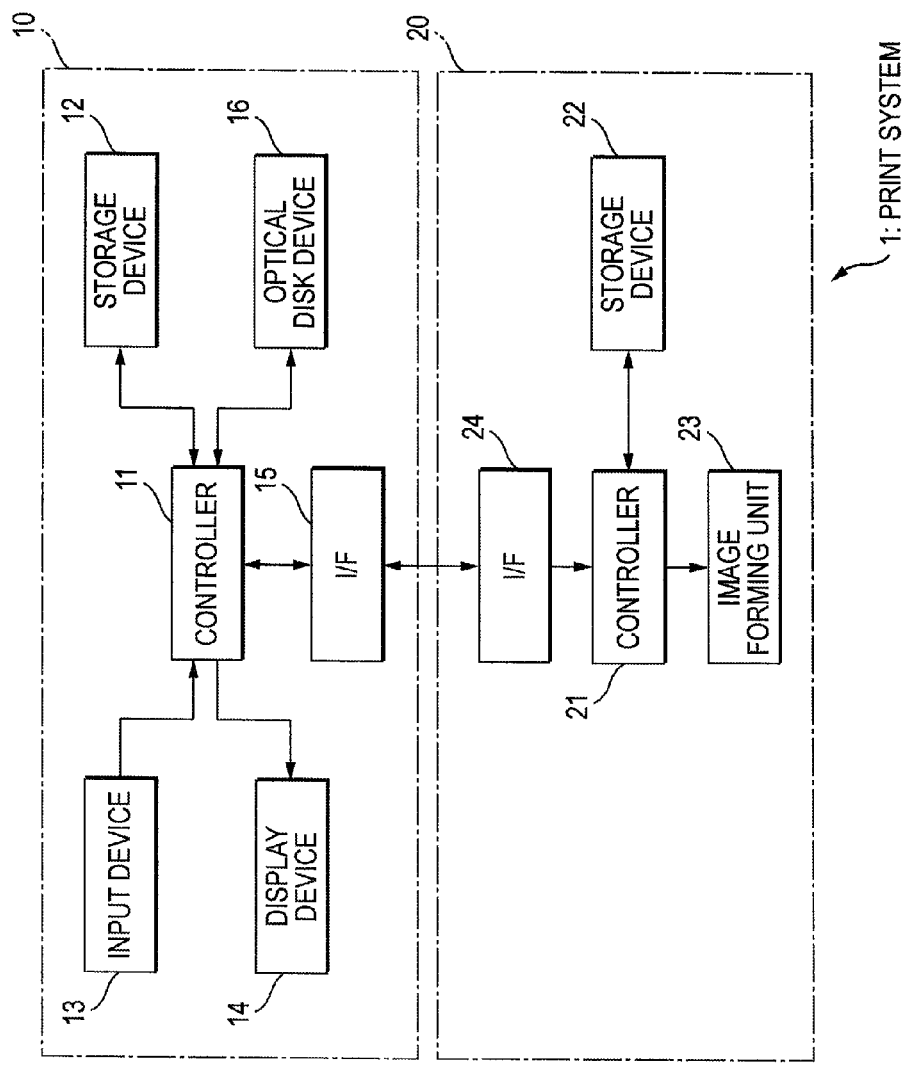
FIG. 1 is a view showing the overall configuration of a print system according to an embodiment of the present invention.

FIG. 1 is a view showing the entire configuration of a print system according to an embodiment of the present invention. As illustrated, a print system 1 includes a print data supplying device 10 (a host computer) and a printer 20. The print data supplying device 10 is embodied by means of a personal computer.

As shown in FIG. 1, the print data supplying device 10 includes a controller 11; a storage device 12; an input device 13; a display device 14; an interface (I/F) 15; and an optical disk device 16.

The controller 11 operates according to an operating system and another program, which are stored in the storage device 12, thereby performing various information processing operations. The storage device 12 is formed from a computer-readable information storage medium. For example, the storage device 12 includes ROM (Read-Only Memory), RAM (Random Access Memory), and a hard disk drive. The storage device 12 stores a program executed by the controller 11. The storage device 12 operates also as work memory which stores various sets of data required during the course of processing performed by the controller 11.

The input device 13 is a keyboard, a mouse, or the like, and inputs to the controller 11 the data conforming to an input operation performed by the user. The display device 14 is a display or the like, and displays information in accordance with an instruction input from the controller 11. In accordance with the instruction input from the controller 11, the optical disk device 16 reads a program or data stored in an optical disk (an information storage medium); e.g., a CD-ROM or the like.

The interface 15 is for connecting various peripheral devices or information storage mediums (memory cards or the like) to the print data supplying device 10. The interface 15 outputs the data input from a peripheral device, or the like, to the controller 11. In accordance with the instruction input from the controller 11, the interface 15 outputs various data to the peripheral device, or the like. The print data supplying device is provided with one or a plurality of connection ports (hereinafter called "USB ports") complying with USB (Universal Serial Bus) interface specifications.

In the print data supplying device 10, data are retained by the operating system while being associated with any one of a plurality of directories (items of group information). Associating data with a directory is herein described as "data being stored in a directory."

In the embodiment, Windows (Registered Trademark) manufactured by Microsoft Corporation is installed as an operating system in the print data supplying device 10. A POS application program (hereinafter described as a "POS application") is installed in the print data supplying device 10. For example, the POS application has a function of creating a receipt image such as that shown in FIG. 2 and another function of commencing operation for printing the receipt image.

The print data supplying device 10 is connected to the printer 20 by way of the interface 15 so that data can be exchanged between the print data supplying device and the printer. As shown in FIG. 1, the printer 20 includes a controller 21, a storage device 22, an image forming unit 23, and an interface (I/F) 24.

The controller 21 controls the entirety of the printer 20. The storage device 22 includes ROM or RAM, and stores various programs and data, which are required for effecting printing operation. The interface 24 receives the data transmitted from the print data supplying device 10, and outputs the thus-received data to the controller 21. The printer 20 is provided with a USB port, as the interface 24. The image forming unit 23 forms an image, which is based on the data input by the controller 21, on an image recording medium, such as a print sheet or the like.

The printer 20 receives from the print data supplying device 10 command data of a predetermined command format (i.e., print data), and forms an image on an image recording medium in accordance with the command data. In the case of the present embodiment, the printer 20 receives command data showing coloring information about each of pixels forming an image, and generates an image on an image recording medium on the basis of the command data. Moreover, the printer 20 receives another set of command data showing specifics for controlling various mechanisms, and controls the mechanisms in accordance with the command data. For example, the printer 20 has an automatic cutting mechanism, and cuts the image recording medium at a given position in a given mode upon receipt of command data instructing cutting of the image recording medium. The command data accepted by the printer 20 are assumed to be command data of "command system 1."

Operation of the print data supplying device 10 performed when printing of a receipt image has been instructed will now be described. FIG. 3 is a view for describing example operation of processing performed by the print data supplying device 10. Although a POS application program 30a and a POS application program 30b are provided in the drawing, at least one of the application programs is installed in the print data supplying device 10.

There will first be described a case where the POS application 30a has issued a command to print the receipt image.

When the POS application 30a issues a command to print the receipt image, various functions of a GDI (Graphic Device Interface) program 31 are activated, as required. This GDI program 31 is a group of functions used for rendering an image and is provided by the operating system.

In this case, a print job is first started, and there are subsequently generated meta data into which a group of GDI commands used for printing a receipt image are recorded. The meta data are not dependent on a device.

When a print job is started, the POS application 30a specifies the designation of the print job. In relation to the name of the print job, a given designation may also be specified for each application, or a different designation may also be specified for each set of image data to be printed. In the case of the present embodiment, a fixed print job name "A" is retained in the POS application 30a. When the receipt image of the POS application 30a is printed, the print job name "A" is specified regardless of the type of a receipt image. The print job name specified by the POS application 30a is retained in association with the print job started by the GDI 31.

The meta data generated by the GDI program 31 are supplied to a printer driver 30a associated with the printer 20. The printer driver 30a generates internal print data (RAW data) from the group of GDI commands recorded in the meta data. The internal print data generated herein include command data showing print specifics for each line, command data showing the type of a font, and the like. The internal print data are not limited to command data of an interpretable command system but may be command data of a command system which is uninterpretable for the printer 20. The printer driver 30a herein is assumed to generate, as internal print data, command data of "command system 2" differing from the "command system 1."

The internal print data generated by the printer driver 34a are supplied to a spooler 35. The spooler 35 monitors the status of the printer 20, and outputs the internal print data to a port driver 40.

As mentioned above, when the POS application 30a has instructed printing of a receipt image, the internal print data are output to the port driver 40 via the GDI 31, the printer driver 34a, and the spooler 35.

Next, there will be described a case where the POS application 30b has instructed printing of a receipt image. Three cases are conceived: namely, 1) the internal print data are output to the port driver 40 via the GDI 31, the printer driver 30a, and the spooler 35; 2) the internal print data are output to the port driver 40 via an internal print data generation program 30b, a spooler API (Application Program Interface 32), and the spooler 35; and 3) the internal print data are output to the port driver 40 via an internal print data generation program 34c and a port output API 33.

Of the above three cases, the case where the internal print data are output to the port driver 40 via the GDI 31, the printer driver 34a, and the spooler 35 is the same as the case where the POS application 30a instructs printing of a receipt image. Accordingly, its explanation is omitted. In the case of the present embodiment, the POS application 30b retains fixed print job name "B." When the GDI 31 starts a print job, the name of the print job "B" is specified regardless of the receipt image.

First, there will be described a case where the internal print data are output to the port driver 40 via the internal print data generation program 34b, the spooler API 32, and the spooler 35.

In this case, the internal print data generation program 30b is requested to generate internal print data, and the internal print data generation program 34b generates internal print data (RAW data). The internal print data generation program 34b may also be provided integrally with the POS application 30b or separately from the POS application 30b. The internal print data generated herein are command data showing print specifics for each line, command data showing the type of a font, and the like. Like the internal print data generated by the printer driver 34a, the internal print data are not limited to the command data of the command system interpretable for the printer 20, but may be command data of a command system uninterpretable for the printer 20. The printer driver 34b is herein assumed to generate command data of command system 2 as internal print data.

When the internal print data generation program 34b has generated the internal print data, various functions of the spooler API 32 are activated, as required. The spooler API 32 is a group of functions used for supplying the internal print data directly to the spooler 35 without involvement of the printer driver 34a, and is provided by the operating system.

In this case, the print job is first started, and internal print data are subsequently supplied to the spooler 35. The spooler 35 monitors the status of the printer 20, and outputs the internal print data to the port driver 40.

When the internal print data generation program 34b is requested to generate internal print data, the POS application 30b specifies the name of the print job. The print job name specified by the POS application 30b is retained in association with the print job started by the GDI 31. As mentioned above, in the case of the present embodiment, the fixed print job name "B" is retained in the POS application 30b. When the print job is initiated, the print job name "B" is specified regardless of the type of a receipt image.

Next, there will be described a case where the internal print data are output to the port driver 40 via the internal print data generation program 34c and the port output API 33.

In this case, the internal print data generation program 34c is requested to generate internal print data, and the internal print data generation program 34c generates internal print data (RAW data). The internal print data generation program 34c may also be provided integrally with the POS application 30b or separately from the POS application 30b. The internal print data generated herein are command data showing print specifics for each line, command data showing the type of a font, and the like. Like the internal print data generated by the printer driver 34a and the internal print data generated by the internal print data generation program 30b, the internal print data are not limited to the command data of the command system interpretable for the printer 20, but may be command data of a command system uninterpretable for the printer 20. The internal print data generation program 34c is herein assumed to generate as internal print data command data of command system 3 which differs from the "command system 1" and the "command system 2."

When the internal print data generation program 34c is requested to generate internal print data, the POS application 30b specifies the name of the print job. The POS application 30b specifies the designation of internal print data. As mentioned previously, in the case of the present embodiment, the fixed internal print data name (print job name) "B" is retained in the POS application 30b. When the name of internal print data is generated, the internal print data name "B" is specified regardless of the type of a receipt image. The name of the internal print data is retained in association with the internal print data.

When the internal print data generation program 34c has generated internal print data, various functions of the port output API 33 are activated, as required. The port output API 33 is a group of functions used for outputting the internal print data directly to the port driver 40 without involvement of the spooler 35, and is provided by, for example, the provider of the POS application 30b, the provider of the printer 20, and the like. As a result of various functions of the port output API 33 being activated as required, the internal print data are output to the port driver 40.

A language monitor program 36 monitors supply of internal print data to the port driver 40. When having detected supply of internal print data to the port driver 40, the language monitor program 36 inhibits supply of the data. The language monitor program 36 provides the internal print data to any of a print data generation program A 39a, a print data generation program B 39b, and a print data generation program C 39c. The language monitor program 36 is also used to receive status information from the printer 20 via the port driver 40 and supply the status information to a predetermined program (e.g., a status reference program and the like).

The language monitor program 36 includes an internal print data sorting program 37. The internal print data sorting program 37 selects a print data generation program to be supplied with internal print data, on the basis of a configuration file 38.

Information that associates conditions pertaining to internal print data (internal print data conditions) with a print data generation program is retained in the configuration file 38. The internal print data conditions include conditions pertaining to an attribute of internal print data, or conditions pertaining to a single data processing operation or a plurality of data processing operations used for outputting internal print data.

FIG. 4 is a view showing example information held in the configuration file 38. In the example shown in the drawing, a combination of the type of an output flow of internal print data and the name of internal print data is associated with a print data generation program. The type of the internal print data output flow shows conditions; namely, the nature of a program which has output internal print data to the port driver 40 (the language monitor program 36). An output flow type "1" shows a case where internal print data have been output to the port driver 40 (the language monitor program 36) via the GDI 31, the printer driver 30a, and the spooler 35. An output flow type "2" shows a case where the internal print data have been output to the port driver 40 (the language monitor program 36) via the internal print data generation program 30b, the spooler API 32, and the spooler 35. Further, an output flow type "3" shows a case where the internal print data have been output to the port driver 40 (the language monitor program 36) via the internal print data generation program 34c and the port output API 33.

The configuration file 38 is a file of a text format or an XML (extensible Markup Language) format, and is stored in a directory assigned to an individual printer (hereinafter called an "individual directory"). The individual directory of the printer 20 is generated in a predetermined directory (hereinafter called an "environment setting directory"). The following descriptions are based on the assumption that the environment setting directory corresponds to "C:¥Program Files¥XXX¥YYY¥Config." "XXX" herein denotes an abbreviation of the provider of the printer 20; and "YYY" herein denotes the model name of the printer 20. Further, when a serial number is stored in the printer 20 so as to be readable by way of the USB interface, the directory name of the individual directory of the printer is determined on the basis of the serial number. In contrast, when the serial number is not stored in the printer 20 so as to be readable by way of the USB interface, the directory name of the individual directory of the printer 20 is determined on the basis of an ID of the USB port connected to the printer 20. For example, when serial number "SN00001" is stored in the printer so as to be readable by way of the USB interface, the individual directory of the printer 20 is determined as "C:¥Program Files¥XXX¥YYY¥Config¥SN00001."

Specifics of the configuration file 38 are edited as a result of direct edition of the file. Moreover, for example, the specifics of the configuration file 38 are also edited by way of a predetermined setting edition screen (not shown).

When the internal print data have been supplied to the language monitor program 36, the internal print data sorting program 37 determines whether or not the internal print data satisfy the internal print data conditions assigned to the print data generation program, by reference to the configuration file 38 stored in the individual directory of the printer 20. On the basis of a result of determination, the internal print data sorting program 37 selects any one from the print data generation program A 39a, the print data generation program B 39b, and the print data generation program C 39c, and executes the thus-selected print data generation program.

In the case of the present embodiment, the internal print data sorting program 37 specifies the output flow type of internal print data. Specifying the output flow type of the internal print data is performed by utilization of a function of the operating system. For example, in the case of Windows (Registered Trademark) manufactured by Microsoft Corporation, the name of a function activated during the course of output of internal print data to the port driver 40 (the language monitor program 36) is retained in association with the internal print data (a print job). Accordingly, the internal print data sorting program 37 determines whether or not the function of the GDI function 31 has been activated during the course of output of internal print data to the port driver 40 (i.e., the language monitor program 36). When the function of the GDI 31 has been activated, the internal print data are determined to have been output to the port driver 40 (the language monitor program 36) via the GDI 31, the printer driver 34a, and the spooler 35. Specifically, the output flow type of the internal print data is determined to be "one." Likewise, when the function of the spooler API 32, has been activated during the course of output of internal print data to the port driver 40 (the language monitor program 36), the output flow type of the internal print data is determined to be "two." Likewise, when the function of the port output API 33, has been activated during the course of output of internal print data to the port driver 40 (the language monitor program 36), the output flow type of the internal print data is determined to be "three." For example, when the port output API 33 outputs internal print data to a virtual COM (serial) port virtually assigned a USB port, a determination may also be made as to whether or not a target to be supplied with internal print data is a virtual COM port, thereby determining whether or not the output flow type of internal print data is "three."

The internal print data sorting program 37 acquires the internal print data name of internal print data. When the output flow type of the internal print data is one or two, the internal print data sorting program 37 acquires a print job name as the name of internal print data.

In accordance with the configuration file 38 stored in the individual directory of the printer 20, the internal print data sorting program 37 selects a print data generation program corresponding to the combination of the output flow type of internal print data with the name of internal print data, from among the print data generation program A 39a, the print data generation program B 39b, and the print data generation program C 39c; and executes the thus-selected print data generation program.

The print data generation program converts internal print data (command data of a certain command system) into command data of a command system interpretable for the printer 20, thereby generating print data used for causing the printer 20 to produce a printout of a receipt image. More specifically, the print data generation program interprets internal print data on the basis of the data which are stored in the storage device 12 and used for interpreting command data of various command systems and font data pertaining to fonts which can be specified by the command data of various command systems, thereby generating raster image data pertaining to a receipt image. After having generated raster image data, the print data generation program generates print data (command data of the command system 1) used for causing the printer 20 to produce a printout of the raster image data.

The print data generation program subjects a receipt image to various processing operations. For example, when generating raster image data, the print data generation program changes the font type of the receipt image to another font type. For example, when the receipt image includes a specific keyword, the print data generation program pastes an advertisement image or a coupon image corresponding to the keyword to the bottom of a receipt image. In this case, on the basis of the internal print data, a determination is made as to whether or not the receipt image includes a keyword. An advertisement image, a coupon image, or the like, is pasted to raster image data. For example, the print data generation program pastes a predetermined background image to the background of the receipt image. In this case, the background image is pasted to the raster image data.

Processing to be performed by the print data generation program is also performed in accordance with the configuration file 38. Specifically, the configuration file 38 stores various types of items of information to which reference is made to generate print data from the internal print data. More specifically, for example, a target font type employed when a font type is converted, a path to a keyword, a path to an image file of an advertisement image (or a coupon image), a path to an image file of a background image, and the like, are stored in the configuration file 38.

As shown in FIG. 4, the print data generation program A 30a is assumed to interpret internal print data of the "command system 2" and perform processing for generating print data of the "command system 1." The print data generation program B 30b is assumed to interpret the internal print data of the "command system 2" and perform processing for generating print data of the "command system 1" while subjecting a receipt image to predetermined processing. The print data generation program C 30c is assumed to interpret internal print data of the "command system 3" and perform processing for generating the print data of the "command system 1."

The print data generated by the print data generation program A 39a, the print data generation program B 39b, or the print data generation program C 39c are output from a port connected to the printer 20 via the port driver 40, and supplied to the printer 20.

As has been described above, in the print system 1, the print data generation program (i.e., the print data generation program A 39a, the print data generation program B 39b, or the print data generation program C 39c) is executed in accordance with the internal print data generated by the printer driver 34a or the internal print data generation programs 34b, 34c, whereby raster image data pertaining to a print subject image are temporarily generated. Subsequently, print data used for causing the printer 20 to produce a printout of the raster image data are generated and supplied to the printer 20. Consequently, in the print system 1, even when the printer has been replaced with another printer, print data (RAW data) intended for a pre-replacement printer have been generated as internal print data by the printer driver 34a and the internal print data generation programs 34b, 34c. As a result, a post-replacement printer can produce a printout similar to that produced by the pre-replacement printer without involvement of changes to specifications or settings of the application program.

In the print system 1, the print data generation program (i.e., the print data generation program B 39b) is executed in accordance with the internal print data generated by the printer driver 34a and the internal print data generation programs 34b, 34c, whereby raster image data pertaining to a print subject image having undergone processing desired by the user are generated. Subsequently, print data used for causing the printer 20 to produce a printout of the raster image data are generated and supplied to the printer 20. Consequently, in the print system 1, the print subject image is subjected to processing desired by the user during the course of generation of a printout, without involvement of changes to specifications or settings of the application program, and a printout of the target image is generated.

Particularly, in the print system 1, the print data generation program used for generating print data from the internal print data can be changed from one internal print data name to another. For example, when, as in the case of the POS applications 30a and 30b, the name of internal print data changes in the print system 1 as the POS application changes, the print data generation program can be switched according to the name of internal print data. In consequence, a print data generation program can be switched on a per-POS-application basis. Likewise, when the name of internal print data changes according to the type of a receipt image to be printed, the print data generation program can be switched according to the type of a receipt image to be printed.

In the print system 1, the print data generation program used for generating print data from internal print data can be changed according to the program that has output internal print data to the port driver 40 (the language monitor program 36). For example, in the print system 1, the print data generation program can be switched according to the output flow type of internal print data, so long as the command system of internal print data changes with the output flow type of internal print data as in the case of an output flow type "1" and "3." As a result, the print data generation program can be switched according to the command system of the internal print data.

Figure 5:
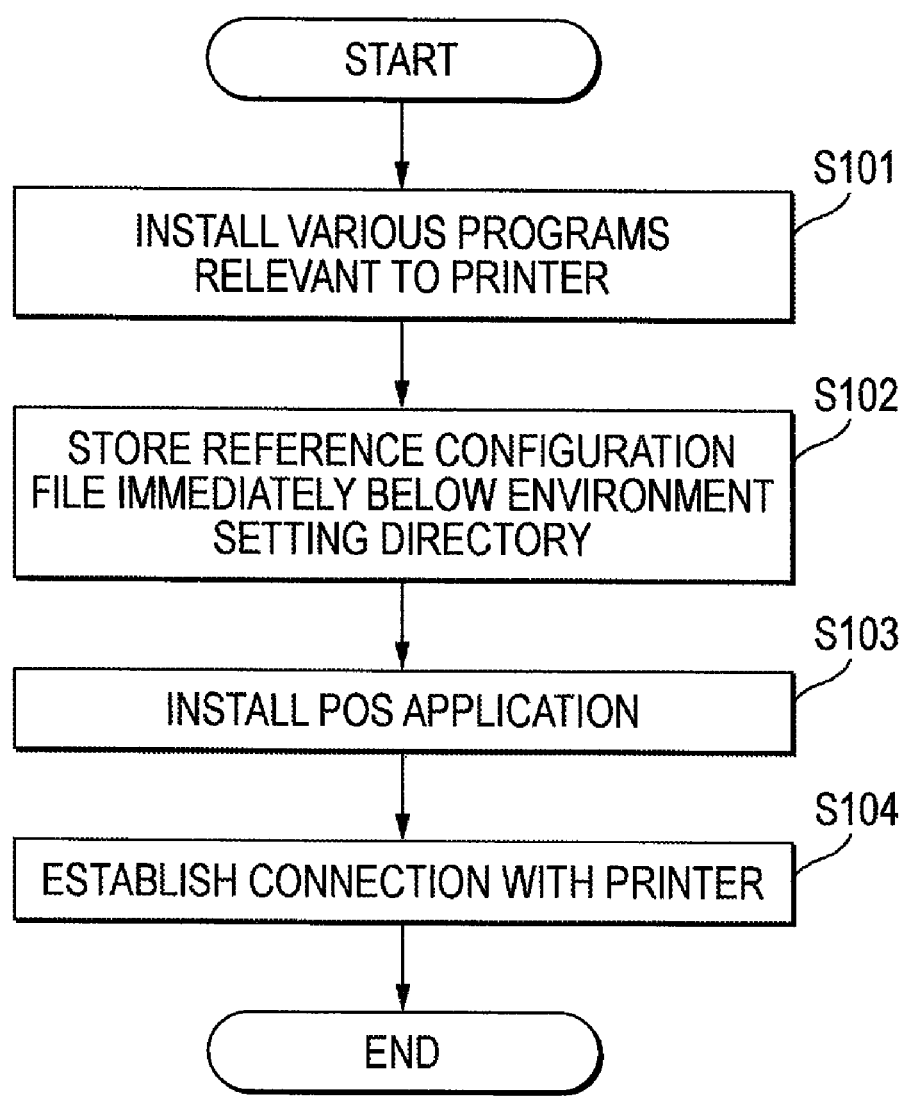
FIG. 5 is a flowchart showing setup procedures of the print data supplying device.

There will now be described setup procedures for causing a computer—in which Windows (Registered Trademark) manufactured by Microsoft Corporation is installed as an operating system—to act as the print data supplying device 10. FIG. 5 is a flowchart showing setup procedures. FIGS. 6A-6D are drawing for describing particularly procedures pertaining to setting of configuration data.

First, a person in charge of setup operation installs into the computer various programs pertaining to the printer 20 (S101) For example, the optical disk device 16 is caused to read an optical disk, such as a CD-ROM, where are stored the various programs pertaining to the printer 20 and an installation program used for installing the programs into the computer, and the installation program is caused to run. In the case of the present embodiment, the various programs pertaining to the printer 20 include the printer driver 34a, the language monitor program 36, the print data generation program A 39a, the print data generation program B 39b, and the print data generation program C 39c. In this case, the programs are installed in the computer, and an environment setting directory (C:¥Program Files¥XXX¥YYY¥Config) is generated (see FIG. 6A).

In this case, a configuration file setting program is also installed in conjunction with the programs. The configuration file setting program is embodied as a so-called resident program. Processing executed by the configuration file setting program will be described later (see FIG. 7).

Figure 6A:
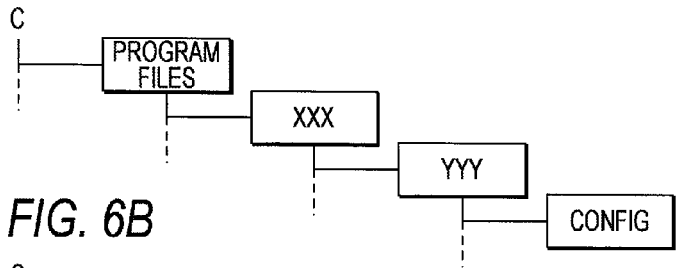
FIGS. 6A-6D are views for describing setup procedures of the print data supplying device.
Figure 6B:
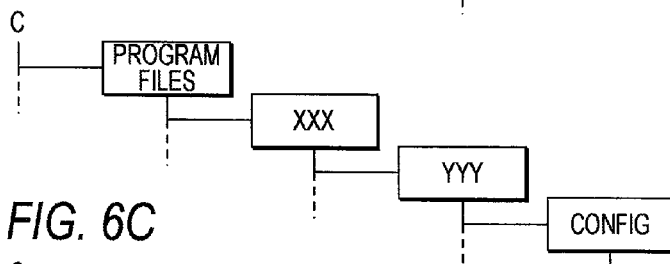
Figure 6C:
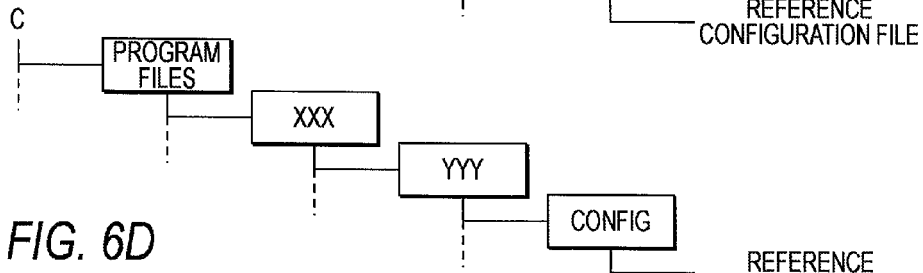
Figure 6D:
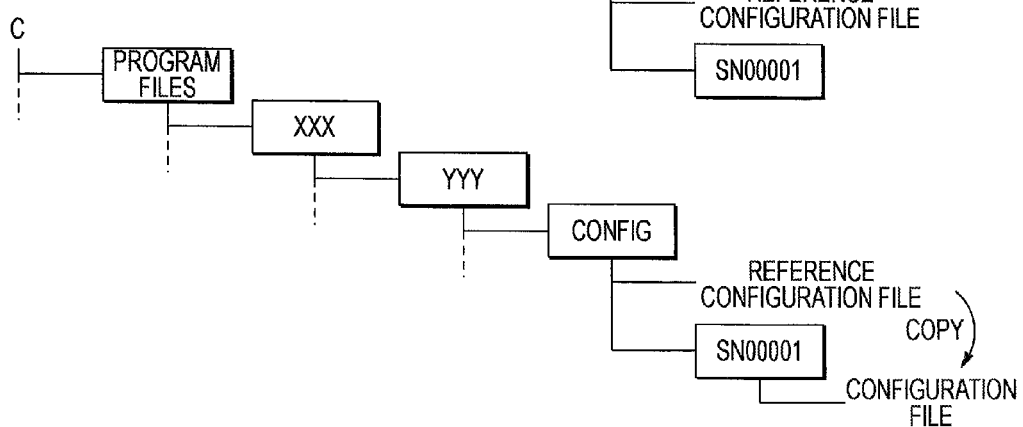

Next, the person in charge of setup operation stores the master of the configuration file 38 (a configuration file from which a duplicate is generated and hereinafter called a reference configuration file) immediately below the environment setting directory (S102: see FIG. 6B). The reference configuration file may also be installed in S101.

Next, the person in charge of setup operation installs the POS application into the computer (S103). The optical disk device 16 is caused to read an optical disk, such as a CD-ROM, into which a POS application and an installation program used for installing the program into the computer are stored, and the installation program is executed. When the POS application 30b is installed, the internal print data generation programs 34b and 34c are installed in conjunction with the port output API 33.

Processing executed by the configuration file setting program will be described here. FIG. 7 is a flowchart showing processing executed by the configuration file setting program.

As shown in FIG. 7, the configuration file setting program monitors whether or not the printer 20 has been connected to the USB port of the computer (S201). When the configuration file setting program has detected that the printer 20 is connected to the computer, the configuration file setting program acquires individual identification information about the printer 20 (S202). In this case, when a serial number is registered in the printer 20 so as to be readable via the USB interface, the serial number is acquired as individual identification information. When the serial number is not registered in the printer 20 so as to be readable via the USB interface, the individual identification information is generated and acquired in accordance with an ID of the USB port connected to the printer and a model ID used for identifying the model type of the printer 20.

The configuration file setting program determines whether or not a directory given, as a directory name, individual identification information acquired in S202 is present immediately below the environment setting directory (S203).

When such a directory is not present, the configuration file setting program generates, immediately below the environment setting directory, an individual directory which is given, as a directory name, the individual identification information acquired in S202 (S204). When SN00001 is acquired as individual identification information in S202, a directory named "SN00001" is generated immediately below the environment setting directory (see FIG. 6C). The configuration file setting program copies the reference configuration file stored immediately below the environment setting directory to the individual directory generated in S204, and stores the thus-copied file as the configuration file 38 (S205: see FIG. 6D). The configuration file setting program again executes processing pertaining to S201. When the reference configuration file is not stored immediately below the environment setting directory, processing pertaining to S205 is not performed, and processing pertaining to S201 is again performed.

When the individual directory given as a directory name the individual identification information acquired in S202 is present immediately below the environment setting directory, the configuration file setting program determines whether or not the configuration file 38 is stored immediately below the individual directory (S206). When the configuration file 38 is not stored, processing pertaining to S205 is performed.

Meanwhile, when the configuration file 38 is stored, the configuration file setting program determines whether or not a time stamp (the last date of revision or the date of preparation) of the configuration file 38 shows a date and time before that indicated by a time stamp of the reference configuration file stored in the environment setting directory (S207). When the time stamp of the configuration file 38 shows a date and time before that indicated by the time stamp of the reference configuration file, processing pertaining to S205 is performed. Meanwhile, when the time stamp of the configuration file 38 does not show a date and time before that indicated by the time stamp of the reference configuration file, processing pertaining to S201 is again performed.

When procedures up to S103 have already been completed, the person in charge of setup operation connects the printer 20 to the USB port of the computer, and activates the power of the printer 20 (S104). In this case, the configuration file setting program resides in the computer, and hence it is detected that the printer 20 has been connected to the USB port (see S201 in FIG. 7). The individual directory of the printer 20 is generated immediately below the environment setting directory (see S202 to S204 in FIG. 7, and FIG. 6C). The reference configuration file stored immediately below the environment setting directory in S102 is copied to the individual directory and stored as the configuration file 38 (S205 in FIG. 7, and see FIG. 6D). Thus, the setup procedures are completed.

In the print system 1, the internal print data sorting program 37, the print data generation program A 39a, the print data generation program B 39b, and the print data generation program C 39c make an access to the individual directory of the printer 20, and perform processing in accordance with the configuration file 38 stored in that directory. Therefore, when the print data supplying device 10 is set up, the configuration file 38 must be stored (generated) in the individual directory of the printer 20.

As mentioned above, when the printer 20 stores the serial number so as to be able to read the serial number via the USB interface, the directory name of the individual directory of the printer 20 corresponds to the serial number. When the printer does not store a serial number so as to be able to read the serial number via the USB interface, the directory name of the individual directory of the printer 20 corresponds to a character string formed from an ID of the USB port connected to the printer 20. Therefore, when a system, such as the print system 1, is delivered, the internal print data sorting program 37, or the like, fails to refer to the previously-stored configuration file 38 if the "serial number of the printer 20 connected to the print data supplying device 10" or the "USB port connected to the printer 20" differs between during setup operation and during practical use despite setup operation having been performed in advance. There may arise a case where processing performed by the internal print data sorting program 37 or the like is not carried out appropriately during actual use of the print system. Consequently, in order to ensure that the internal print data sorting program 37, or the like, appropriately performs processing, at least operation for setting the configuration file 38 (operation for storing the configuration file 38 into an individual directory) must be performed after the print data supplying device 10 and the printer 20 have been positioned in an actual use area and connected together.

In this respect, according to the setup procedures (see FIG. 5) of the previously-described print data supplying device 10, processing shown in FIG. 7 is performed by the configuration file setting program. As a result, at the time of delivery of the print system 1, the essential requirement for the person in charge of setup operation of the print system 1 is to perform only the minimum procedures for setting the print data supplying device 10 and the printer 20 and interconnecting them, in an actual use area (S104), so long as work operations pertaining to S101 to S103 have been performed in advance. Operation for setting the configuration file 38 can be completed comparatively readily. Consequently, the setup operations performed in the actual use area at the time of delivery of the print system 1 can be completed immediately.

Figure 8:
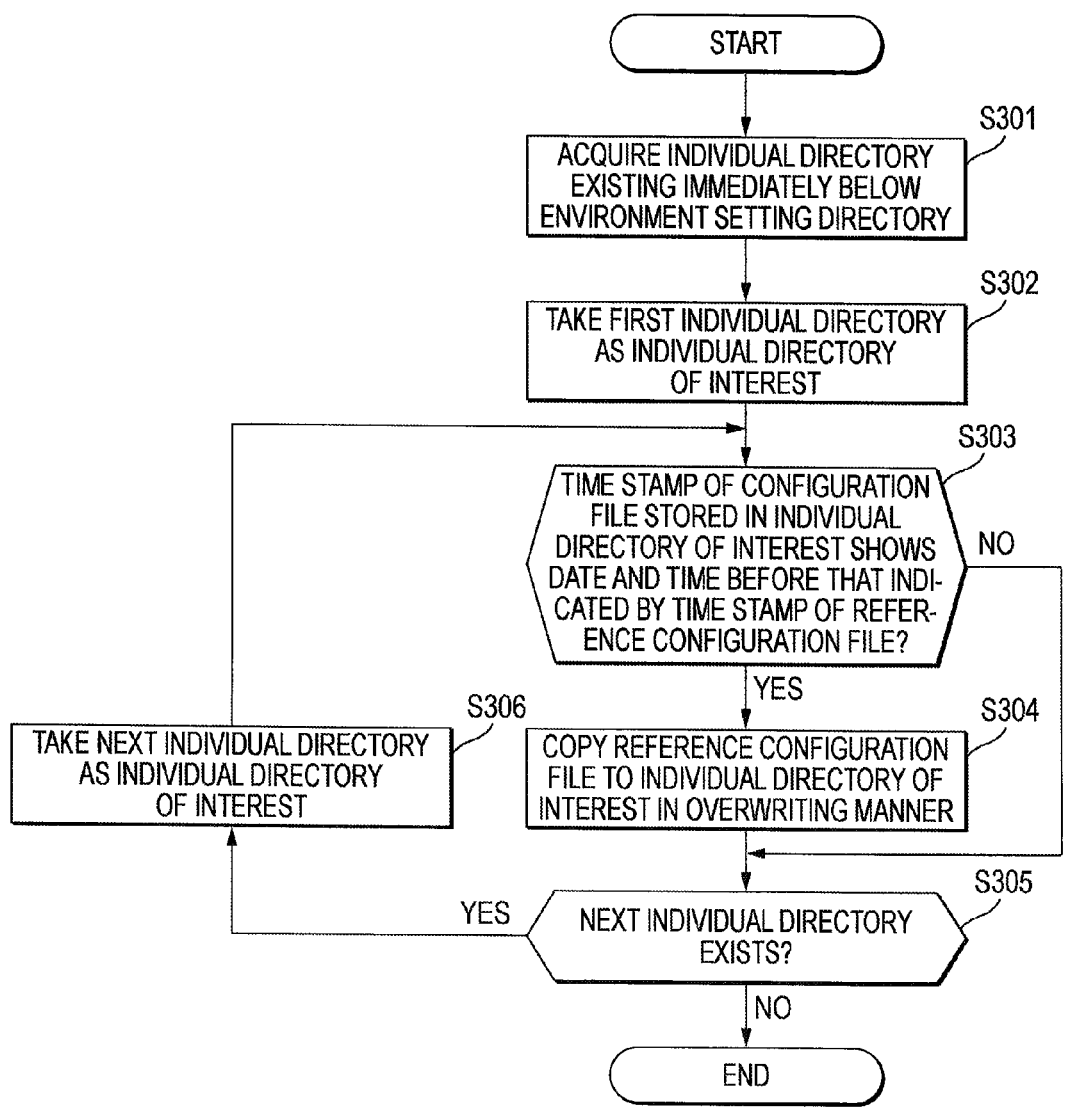
FIG. 8 is a flowchart showing processing performed by the configuration file setting program.

The configuration file setting program is supposed to reside after initiation of operation of the print system 1; performs processing shown in FIG. 7; and performs processing such as that shown in FIG. 8, at every predetermined time or a preset timing (e.g., at a regular time every day).

Specifically, the configuration file setting program first acquires a list of individual directories which are present immediately below the environment setting directory (S301). The list is sorted in an ascending sequence of directory names.

Next, the configuration file setting program takes a first individual directory as an individual directory of interest (S302). A determination is made as to whether or not a time stamp of an configuration file 38 stored in the individual directory of interest shows a date and time before that indicated by the time stamp of the reference configuration file stored in the environment setting directory (S303). When the time stamp of the configuration file 38 shows a date and time before that indicated by the time stamp of the reference configuration file, the configuration file setting program copies the reference configuration file into the individual directory of interest in an overwriting manner (S304).

Subsequently, the configuration file setting program determines whether or not the next individual directory is present (S305). When the next individual directory is present, the individual directory is taken as an individual directory of interest (S306), and processing pertaining to S303 to S305 is performed. Meanwhile, when the next individual directory is not present; namely, when all individual directors existing immediately below the environment setting directory have been subjected to processing pertaining to S303 and S304, the present processing is completed.

In the print system 1, the above processing is performed by the configuration file setting program. As a result, when making an attempt to update the configuration file 38 of the print data supplying device 10, the essential requirement for an administrator of the print system 1 is to store a new configuration file 38 into the environment setting directory of the print data supplying device 10 as a reference configuration file. Update of the configuration file 38 can be performed comparatively readily.

A destination where the reference configuration file is to be stored may also be set in an arbitrary way. Moreover, the reference configuration file may also be stored in a server connected to the print data supplying device 10 through communication by way of a communications network. In this case, the configuration file setting program may receive the reference configuration file distributed by the server and store the thus-received file as the configuration file 38 in an individual directory located immediately below the environment setting directory. Alternatively, distribution of the reference configuration file performed by the server may also be performed in accordance with a distribution request made by the configuration file setting program or at every predetermined time or preset timing (e.g., a regular time every day). By means of such settings, when the plurality of print data supplying devices 10 are set up or when the configuration files 38 of the plurality of print data supplying devices 10 are updated, the essential requirement for the server is to store the reference configuration file, thereby obviating a necessity for storing the reference configuration file in the environment setting directory in each print data supplying device 10. Hence, labor of the person in charge of setup of the print system 1 or that of the administrator of the print system 1 can be lessened.

The present invention is not limited to the embodiments described above.

For example, the operating system executed by the host computer 10 is not limited to Windows (Registered Trademark) manufactured by Microsoft Corporation. Moreover, the application programs executed by the host computer 10 are not limited to the POS applications 30a, 30b. In other words, objects to be printed by the printer 20 are not limited to receipt images generated by the POS applications 30a, 30b and may also be a document, an image, or the like, generated by another application program.

Further, the host computer 10 and the printer 20 have been described as being connected together by way of the USB interface. However, the host computer 10 and the printer 20 may also be connected together via another interface.

For example, a program (e.g., a port emulator or the like) given a designation other than "language monitor program" may be used in lieu of the language monitor program 36.

The foregoing description of the embodiment has been presented for purposes of illustration and description. It is not intended to be exhaustive or to limit the invention to the precise form disclosed, and modifications and variations are possible in light of the above teachings or may be obtained from practice of the invention. The embodiment was chosen and described in order to explain the principles of the invention and its practical application program to enable one skilled in the art to utilize the invention in various embodiments and with various modifications as are suited to the particular use contemplated. It is intended that the scope of the invention be defined by the claims appended hereto, and their equivalents.

What is claimed is:

1. A method for setting configuration data to a print data supplying device, comprising:

storing, by the print data supplying device, configuration data in a directory, which is generated based on a serial number of a printer connected to the print data supplying device, or an ID of a USB port, of the print data supplying device, to which the printer is connected and a model ID for identifying a model type of the printer, among a plurality of directories;

generating, by the print data supplying device, print data based on:

(1) internal print data generated by an internal print data generation program; and (2) the configuration data stored in the directory, which is generated based on the serial number of the printer to which the print data is supplied, or the ID of the USB port and the model ID for identifying the model type of the printer;

supplying, by the print data supplying device, the print data to the printer;

determining whether or not a target printer is connected to the print data supplying device;

acquiring identification information, by the print data supplying device, from the target printer when it is determined that the target printer is connected to the print data supplying device, the identification information of the target printer being one of a serial number of the target printer, and an ID of a USB port, of the print data supplying device, to which the target printer is connected and a model ID for identifying a model type of the target printer;

generating a new directory based on the acquired identification information of the target printer when it is determined that the target printer is connected to the print data supplying device; and copying predetermined reference configuration data into the new directory, as the configuration data.

2. The method according to claim 1, further comprising:
comparing a time stamp of the configuration data stored in the new directory with a time stamp of the predetermined reference configuration data, when another directory that is generated based on the identification information of the target printer already exists among the plurality of directories; and
copying the predetermined reference configuration data to the new directory, in accordance with the result of the comparison.

3. A non-transitory computer-readable medium containing program instructions that when executed cause a system to perform a process for setting configuration data to a print data supplying device, comprising:
storing, by the print data supplying device, configuration data in a directory, which is generated based on
a serial number of a printer connected to the print data supplying device, or
an ID of a USB port, of the print data supplying device, to which the printer is connected and a model ID for identifying a model type of the printer,
among a plurality of directories;
generating, by the print data supplying device, print data based on:
(1) internal print data generated by an internal print data generation program; and
(2) the configuration data stored in the directory, which is generated based on
the serial number of the printer to which the print data is supplied, or
the ID of the USB port and the model ID for identifying the model type of the printer;
supplying, by the print data supplying device, the print data to the printer;
determining whether or not a target printer is connected to the print data supplying device;
acquiring identification information, by the print data supplying device, from the target printer when it is determined that the target printer is connected to the print data supplying device, the identification information of the target printer being one of
a serial number of the target printer, and
an ID of a USB port, of the print data supplying device, to which the target printer is connected and a model ID for identifying a model type of the target printer;
generating a new directory based on the acquired identification information of the target printer when it is determined that the target printer is connected to the print data supplying device; and
copying predetermined reference configuration data into the new directory, as the configuration data.

* * * * *

UNITED STATES PATENT AND TRADEMARK OFFICE
CERTIFICATE OF CORRECTION

PATENT NO. : 8,339,634 B2  
APPLICATION NO. : 11/616339  
DATED : December 25, 2012  
INVENTOR(S) : Albert Kennis et al.

Page 1 of 1

It is certified that error appears in the above-identified patent and that said Letters Patent is hereby corrected as shown below:

In column 3, last line, insert --10-- after "device"

In column 5, lines 13, 14, 22 and 37, delete "$30a$" and instead insert --$34a$--

In column 5, line 39, delete "$30b$" and instead insert --$34b$--

In column 5, line 56, delete "$30b$" and instead insert --$34b$--

In column 6, line 36, delete "$30b$" and instead insert --$34b$--

In column 7, line 32, delete "$30a$" and instead insert --$34a$--

In column 7, line 35, delete "$30b$" and instead insert --$34b$--

In column 7, lines 54 and 60, insert --20-- after "printer"

In column 9, line 33, delete "$30a$" and instead insert --$39a$--

In column 9, line 36, delete "$30b$" and instead insert --$39b$--

In column 9, line 40, delete "$30c$" and instead insert --$39c$--

In column 11, line 30, insert --20-- after "printer"

In column 12, at the end of line 31, insert --20-- after "printer"

Signed and Sealed this  
Nineteenth Day of February, 2013

Teresa Stanek Rea  
*Acting Director of the United States Patent and Trademark Office*